United States Patent [19]

Titterud

[11] Patent Number: 4,615,263
[45] Date of Patent: Oct. 7, 1986

[54] DRY VENT FOR MOTOR HOMES

[76] Inventor: Curtiss W. Titterud, 6921 NW. 162nd La., Anoka, Minn. 55303

[21] Appl. No.: 688,573

[22] Filed: Jan. 3, 1985

[51] Int. Cl.⁴ .............................................. B60H 1/26
[52] U.S. Cl. ........................................ 98/2.14; 98/13
[58] Field of Search .................... 98/2, 2.11, 2.14, 2.16, 98/2.17, 8, 13, 37; 49/98

[56] References Cited

U.S. PATENT DOCUMENTS

| | | | |
|---|---|---|---|
| 2,172,939 | 9/1939 | Lintern et al. | 98/2.14 |
| 2,372,164 | 3/1945 | Woodhams | 98/2.14 |
| 2,854,914 | 10/1958 | Galbraith | 98/13 |
| 3,401,620 | 9/1968 | Armstrong et al. | 98/2.14 |
| 3,934,383 | 1/1976 | Perry et al. | 98/2.14 |
| 3,979,148 | 9/1976 | Martin | 98/2.14 |
| 4,038,911 | 8/1977 | Hart | 98/2.14 |
| 4,193,339 | 3/1980 | Giles | 98/2.14 |
| 4,395,939 | 8/1983 | Hough et al. | 98/2.14 |

*Primary Examiner*—Henry C. Yuen
*Attorney, Agent, or Firm*—Dorsey & Whitney

[57] ABSTRACT

A dry vent is provided that permits ventilation of motor homes, travel trailers, or the like, while blocking entrance of rain and small animals through the ventilation duct. The dry vent hereof is especially designed for installation on existing ceiling ports, without modification of the port or the port cover. The dry vent includes a pair of opposed water-blocking sidewalls interconnected by a front structure comprising a pair of spaced apart louvres that define an inwardly, upwardly directed air passing channel.

1 Claim, 5 Drawing Figures

U.S. Patent  Oct. 7, 1986  4,615,263
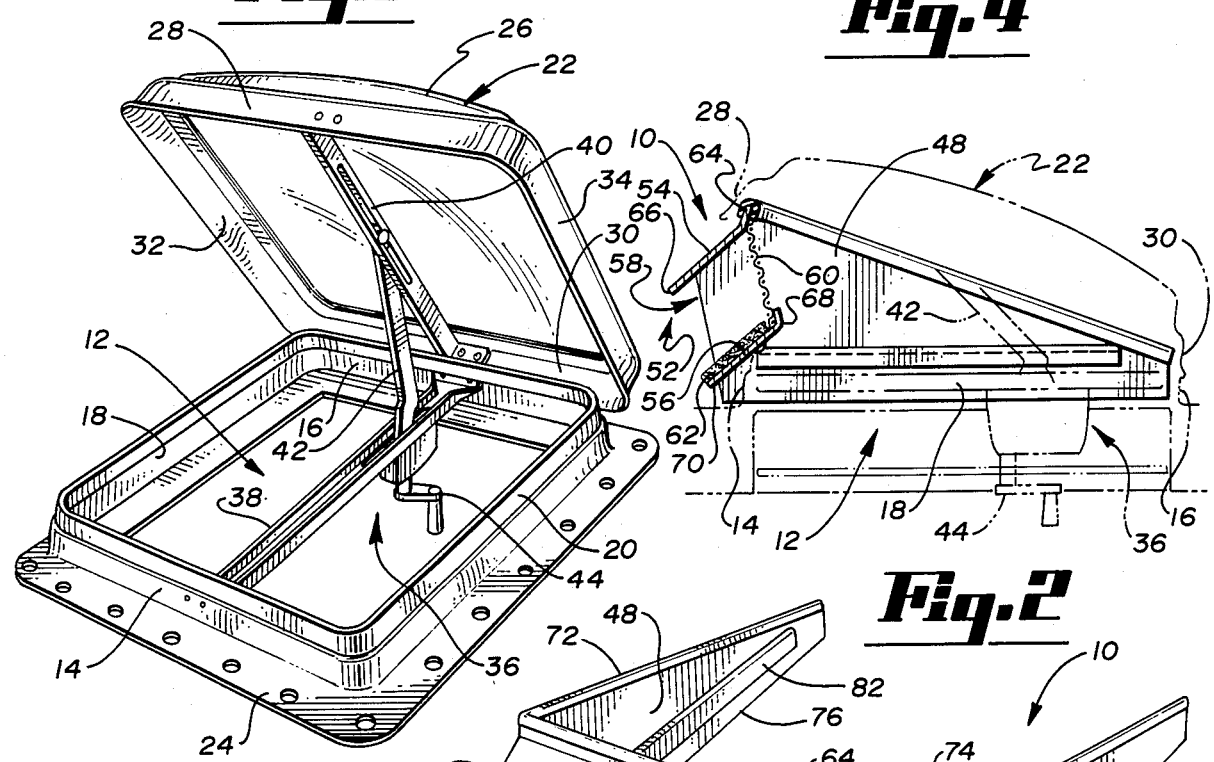
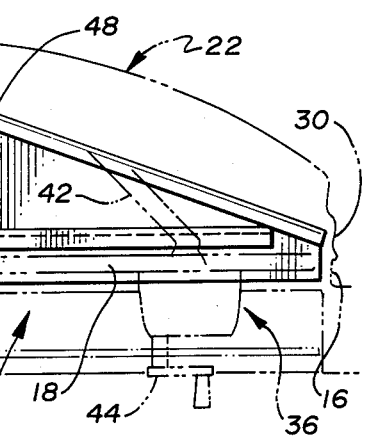
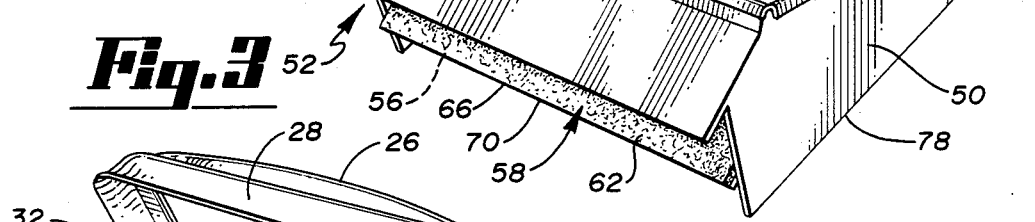
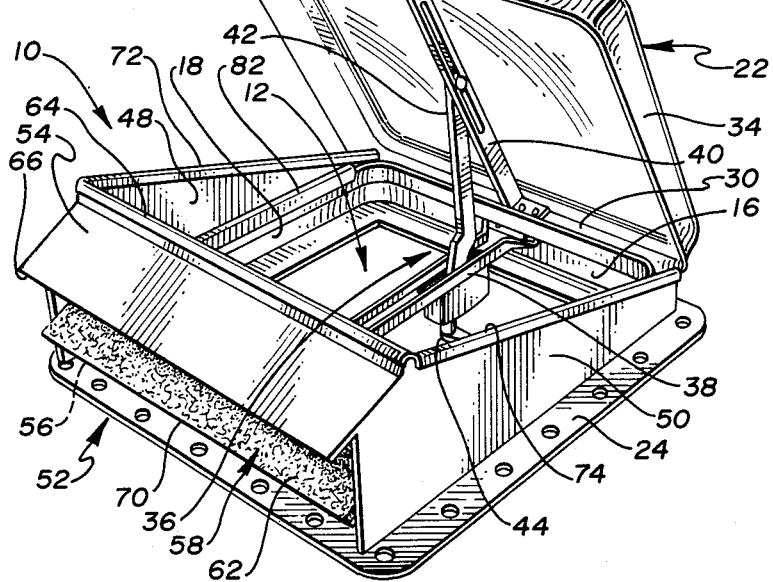
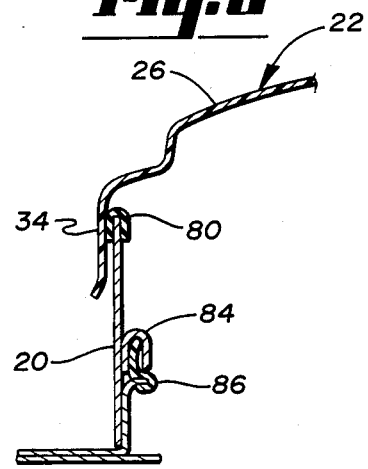

DRY VENT FOR MOTOR HOMES

TECHNICAL FIELD

The present invention relates to ventilation of motor homes, recreational vehicles, travel trailers, and similar equipment. In particular, it pertains to a removable dry vent that can be installed in a ceiling port to permit ventilation of a motor home or the like, while blocking entry of rain through the ventilation duct.

BACKGROUND OF THE INVENTION

Motor homes and recreational vehicles are often provided with ceiling ports having hinged, watertight covers. The covers can be selectively shifted to port clearing positions, permitting air flow through the port, for ventilation of the motor home or recreational vehicle. The covers can also be secured over the ceiling port in watertight relationship, to prevent entry of rain through the port.

Motor homes and recreational vehicles are often left vacant for considerable periods of time. Ceiling port covers of vacant motor homes and the like must be secured in their watertight, air blocking configuration to prevent entry of rain water, and small animals, through the open port. Temperatures in an unventilated motor home or recreational vehicle can easily exceed 165° Farenheit. during the summer months, causing damage due to melting, warping, and similar heat related occurrences.

A vent structure that could easily be retrofitted onto existing motor home and recreational vehicle ceiling ports, that would permit the flow of air through the port while blocking rain and small animals from entering into the vehicle through the open port, and that could safely be left in place while the vehicle was left vacant, would be a decided advantage.

SUMMARY OF THE INVENTION

The problems outlined above are in large measure solved by the dry vent for motor homes in accordance with the present invention. That is to say, the dry vent hereof is easily installed onto existing motor home or recreational vehicle ceiling ports without modification of the port or port cover, and can provide for ventilation of vacant motor homes, recreational vehicles, and the like, while preventing the entrance of rain and small animals through the ceiling port.

The dry vent in accordance with the present invention broadly includes a pair of opposed, water-blocking sidewalls interconnected by a front structure. The sidewall are receivable by the upward standing ceiling port margins, and include inclined upper edges for rain tight engagement with the hinged port cover. The front structure includes a pair of opposed louvres that define an inwardly, upwardly directed air-passing channel.

BRIEF DESCRIPTION OF THE DRAWING

FIG. 1 is a perspective view of a motor home or a recreational vehicle ceiling port, having a shiftable, hinged cover.

FIG. 2 is a perspective view of a dry vent in accordance with the present invention.

FIG. 3 is similar to FIG. 1, with a dry vent in accordance with the present invention installed on the ceiling port.

FIG. 4 is a sectional, side view of a dry vent in accordance with the present invention, phantom lines depicting the ceiling port and cover between which the dry vent is installed.

FIG. 5 is a fragmentary, cross-sectional view of the dry vent and associated ceiling port and cover.

DETAILED DESCRIPTION OF THE DRAWINGS

Referring to the drawings, a dry vent 10 in accordance with the present invention is shown in conjunction with the ceiling port 12 of a motor home or the like. Ceiling port 12 is defined by front, rear and side margins 14, 16, 18, 20, and includes an associated port cover 22. The margins 14, 16, 18, 20 comprise upwardly standing lips fixedly attached to an outermost attachment flange 24.

The port cover 22 includes top wall 26 and downwardly extending front, rear and side cover margins 28, 30, 32, 34. The port cover 22 is hingeably connected to the rear ceiling port margin 16 and is shifted between port clearing and port covering positions about its hinged connection to the rear port margin 16 by shifting apparatus 36.

Shifting apparatus 36 includes lower brace 38 extending between the front and rear port margins 14, 16, and upper brace 40 extending between the port cover front and rear margins 28, 30. Shiftable arm 42 interconnects the lower and upper braces 38, 40. Rotatable actuating mechanism 44 is connected to shifting arm 42.

The dry vent 10 comprises a panel 46 having opposed sidewalls 48, 50 interconnected by front structure 52. Front structure 52 includes spaced apart louvres 54, 56 that define an upwardly, inwardly air-directing channel 58. A screen 60 extends between the louvres 54, 56 and across the air-directing channel 58. Lower louvre 56 preferably includes a liquid diffusing material such as matted fibers on its uppermost surface. Referring in particular to FIG. 4, it will be seen that lourvres 54, 56 comprise generally rectangular plates extending between sidewalls 48, 50. The louvres 54, 56 are in generally parallel relationship with each other, and each include an inner, uppermost margin and an outer, lowermost margin, 64, 66, 68, 70. The inner, uppermost margins 64, 68 of the louvres 54, 56 each comprise an upwardly turned lip.

The dry vent sidewalls 48, 50 each include a first, upper sidewall edge 72, 74 and a second, lower sidewall edge 76, 78. The sidwall upper edges 72, 74 are inclined relative to the sidewall lower edges 76, 78. The upper sidewall edges 76, 78 may be stamped and rolled as depicted in FIGS. 2 and 3, or may include a rubberized cushion 80 as shown in FIG. 5.

The internal faces of sidewalls 48, 50 include downwardly facing, U-shaped channels 82, 84, respectively. The channels are received by port side margins 18, 20. As depicted in FIG. 5, the port side margins may include rolled flange 86 on which the leading edges of channels 82, 84 rest.

The dry vent 10 in accordance with the present invention is easily retrofitted onto an existing motor home ceiling port, without modification of the ceiling port or cover structure. As depicted in FIG. 3, the ceiling port cover 22 is initially shifted to its port clearing position, and the dry vent 10 is inserted between the ceiling port and the port cover. The downwardly facing U-shaped channels 82 on the dry vent sidewalls 48, 50 are received by the upwardly extending port side margins 18, 20. The lower sidewall edges 76, 78 rest against the port attachment flange 24, and the lower face of lower louvre 56 abuts against the ceiling port front margin 14.

Once the dry vent 10 is installed on the ceiling port margins, the port cover 22 is shifted downwardly through its arcuate path of travel into contact with the dry vent 10. As depicted in FIG. 4, the port cover side margins 32, 34 overlap the dry vent sidewall upper edges 72, 74 in rain-tight relationship. Likewise the upper louvre inner margin 64 is overlapped by the port cover front margin 28 in rain-tight relationship. The dry vent is effectively locked in place, and not removable externally of the motor vehicle, since the port cover actuating mechanism is accessible only from inside the vehicle.

When properly installed, the dry vent 10 provides an inwardly, upwardly air-directing channel through the vent and into the motor vehicle or the like, while blocking the passage of rain through the port. The overhang of the upper louvre outer margin 66 over the lower louvre outer margin 70 keeps to a minimum any direct contact of raindrops with the lower louvre 56. The liquid diffusing material 62 on the lower louvre 56 inhibits splashing of any rain drops that do impinge on the lower level into the port.

I claim:

1. A removable vent for a port in the ceiling of a motor home, said port being defined by upstanding, front, rear and opposed, side port margins, said port including a port cover hingeably coupled to said ceiling along a pivot axis, said port cover including front, rear, and opposed side, cover margins selectively engageable with said front, rear, and opposed, side, port margins respectively, said cover being pivotally shiftable between a raised port clearing and a lowered port covering position through an arcuate path of travel, comprising:

opposed, upright, rain blocking sidewalls, each sidewall including an outer face and an internal face, each of said sidewalls including a respective downwardly facing, U-shaped in-cross-section channel coupled to respective ones of said internal faces for removably engaging said sidewalls with respective ones of said port side margins in rain-tight relationship, and each of said sidewalls further including respective upper edges oriented transversely to respective ones of said channels whereby said cover may be lowered through said arcuate path of travel into engagement with said vent for removable, rain-tight engagement of said opposed side cover margins with respective ones of said sidewall upper edges;

a generally rectangular, upper louvre plate extending between and formed integrally with said sidewalls, said upper louvre plate including an upstanding top wall including a top edge extending generally between said respective sidewall upper edges, said upper louvre top wall top edge removably engageable with said front cover margin in rain-tight relationship when said cover is lowered through said arcuate path of travel into engagement with said vent, said upper louvre plate further including an outwardly extending bottom edge oriented generally parallel to and lower than said top edge, said upper louvre plate presenting an inclined, downwardly facing lower surface extending generally between said louvre bottom edge and said louvre top wall;

a generally rectangular, lower louvre plate extending between said respective sidewalls, said lower louvre plate oriented generally parallel to said upper louvre plate, said lower louvre plate presenting an inclined, downwardly facing lower surface engageable with said port front margin, and an inclined, upwardly facing surface, said upper louvre lower surface and said lower louvre upper surface defining an upwardly inwardly directed air channel;

means for diffusing liquid operably covering said lower louvre plate upper surface whereby rain hitting said lower louvre plate upper surface is inhibited from splashing through said channel; and a screen extending between said upper and lower louvre plates, across said air channel.

* * * * *